United States Patent [19]

Joyal

[11] 4,300,219
[45] Nov. 10, 1981

[54] BOWED ELASTOMERIC WINDOW
[75] Inventor: Arthur B. Joyal, Bristol, R.I.
[73] Assignee: Raytheon Company, Lexington, Mass.
[21] Appl. No.: 33,649
[22] Filed: Apr. 26, 1979
[51] Int. Cl.³ .............................................. H04R 17/00
[52] U.S. Cl. ..................................... 367/174; 310/337; 367/171; 367/172
[58] Field of Search ........................ 310/324, 335, 337; 29/421 R, 451, 454, 446; 367/150, 157, 163, 166, 171, 174, 167, 172

[56] References Cited
U.S. PATENT DOCUMENTS 2,589,135  3/1952  Rafuse ................................ 367/166
3,168,659  2/1965  Bayce et al. ....................... 367/150
3,239,801  3/1966  McGaughey ...................... 310/335

*Primary Examiner*—Harold J. Tudor
*Attorney, Agent, or Firm*—Martin M. Santa; Joseph D. Pannone

[57] ABSTRACT

A window for a sonar transducer housing is formed of an elastomeric plate which is bonded to a mounting ring for securing the window to the housing. The plate is bowed with a convex shape during the molding and the curing of the elastomer. During assembly of the housing, the convex surface of the plate faces inwardly and is depressed to a substantially planar configuration by the pressure of oil within the housing. The compression of the elastomer against the mounting ring inhibits separation of the elastomer from the ring.

10 Claims, 6 Drawing Figures

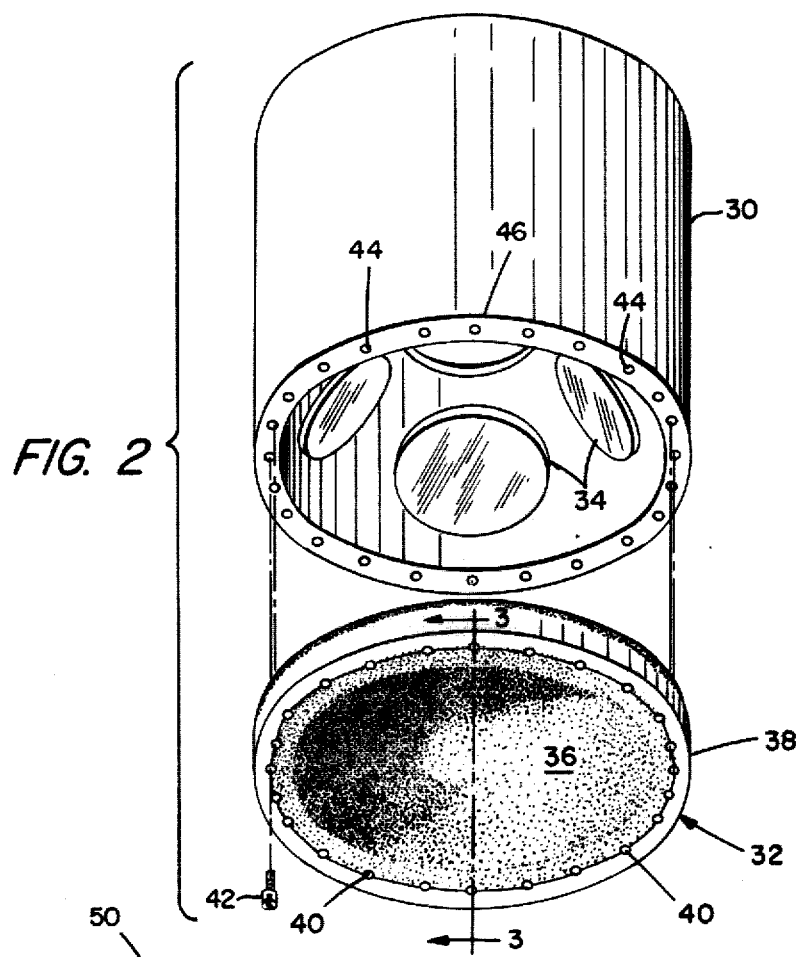
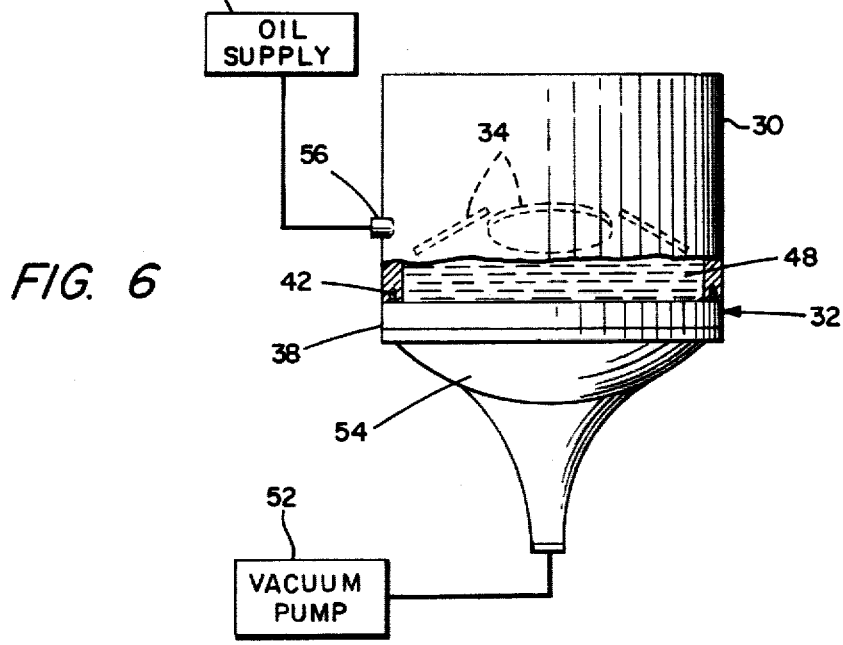

BOWED ELASTOMERIC WINDOW

BACKGROUND OF THE INVENTION

Sonar transducers are often carried by ships to serve as depth sounders and to perform other functions such as the locating of fish and the measurement of the ship's speed. The transducer of the sonar system is positioned within a housing having a sound transmissive window located on the keel of the ship, the housing being preferably located near the bow of the ship in order to reduce the amount of noise received from the ship's screws.

Generally, ships, such as war ships, passenger cruise ships and oil tankers, sail with the water line at the surface of the water so that the transducer housing is well below the water surface and thereby protected from the forces of the waves. Except in the case of very stormy seas, it is unlikely that the window of the housing will be lifted out of the water.

However, a problem has arisen in the case of certain freighters, such as those used in the ferrying of automobiles, in that the freighters may carry cargo in only one direction and return empty, riding high in the water. The draft of the empty freighter is so small that the bow of the freighter may lift out of the water during normal seas with the result that the window may often crash hard against the surface of a wave. When the window is constructed of a rigid plate of sound transmissive material such as acrylonitrile-butadiene styrene (ABS plastic), the window has been found to fracture with the unfortunate loss of the function of the sonar system. Windows have also been constructed of flat plates of elastomeric material which are secured to a mounting ring, the material being in a state of tension resulting from shrinkage during the curing of the material. In such windows, the material tends to slowly weaken at the interface between the plate and the ring and, eventually, separates from the ring. Thereupon, the waves tear the plate from the ring admitting the ocean water into the housing with the loss of the sonar function.

SUMMARY OF THE INVENTION

The foregoing problem is overcome and other advantages are provided by a sonar housing having a window which, in accordance with the invention, is fabricated of an elastomeric plate which is molded in the form of a section of a sphere. During assembly of the housing, the convex surface of the window extends into the housing. The housing is filled with oil, the oil serving as a medium for transmitting sound waves between transducers contained within the housing and the window, the window serving to couple sound waves between the oil and the ocean. The oil in the housing is under sufficient pressure to depress the window away from the housing and thereby convert the spherical form to a substantially planar form. The distortion of the window from the spherical form to the planar form results in a compression of the elastomeric material, the material being compressed against the mounting ring so as to preclude the separation of the material from the ring. Thereby, the flexibility of the material inhibits the fracturing of the window while the compression of the material inhibits a cleavage at the interface between the material and the ring to prevent the entry of water into the housing.

BRIEF DESCRIPTION OF THE DRAWINGS

The aforementioned aspects and other features of the invention are explained in the following description taken in connection with the accompanying drawings wherein:

FIG. 2 is an exploded view of the transducer housing of FIG. 1, the exploded view showing the window of the invention with its mounting ring for securing the window to the housing;

FIG. 6 is a diagrammatic view of a vacuum apparatus for distorting the spherical form of the window to a planar form during the filling of the housing with oil.

DESCRIPTION OF THE PREFERRED EMBODIMENT

Figure 1:
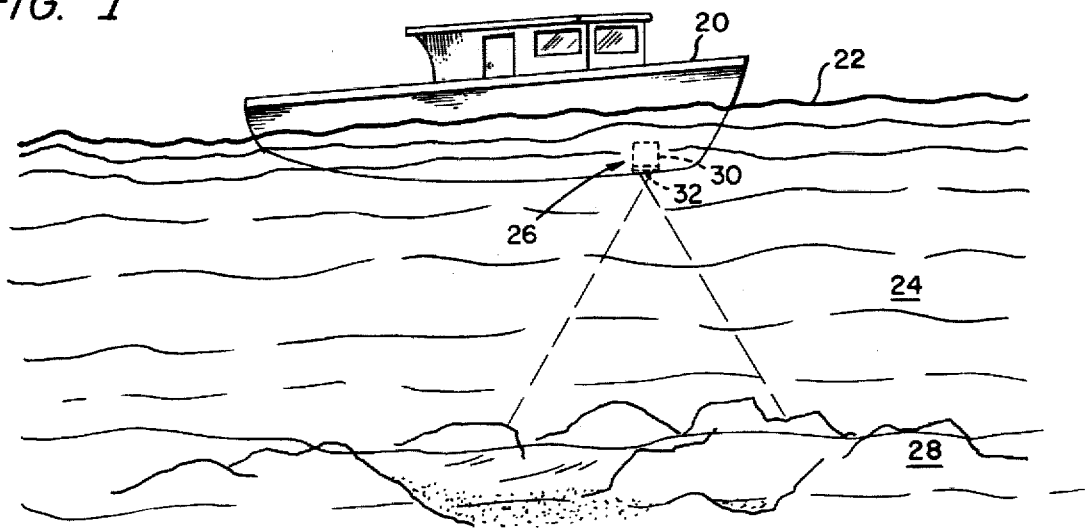
FIG. 1 is a stylized view of a ship carrying sonar transducers contained within a housing located near the bow of the ship.

Referring now to FIG. 1, there is seen a ship 20 sailing on the surface 22 of the ocean 24 and carrying a sonar system 26, the system 26 being shown in an exemplary operation of transmitting sonic signals to the ocean bottom 28 for depth finding. The sonar system 26 includes a sonar transducer housing 30 which is constructed in accordance with the invention for resisting the impact of a wave against a window 32 of the housing 30 in the event that the bow of the ship 20 were to lift above the surface 22.

Referring now to FIGS. 2-5, the housing 30 is seen to contain four sonar transducers 34. The window 32 comprises a semi-rigid disk, or plate, 36 secured about its periphery to a mounting ring 38. The plate 36 is composed of an elastomeric material such as urethane, synthetic rubber such as neoprene, or natural rubber which has been formulated to provide a desired set of acoustic properties. The mounting ring 38 is composed of a material resistant to sea water such as bronze.

Figure 3:
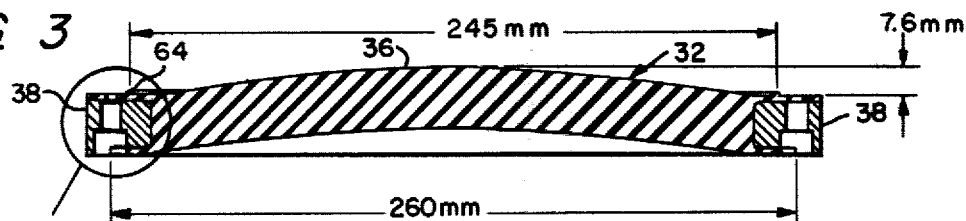
FIG. 3 is a sectional view of the window taken along the lines 3—3 of FIG. 2.
Figure 5:
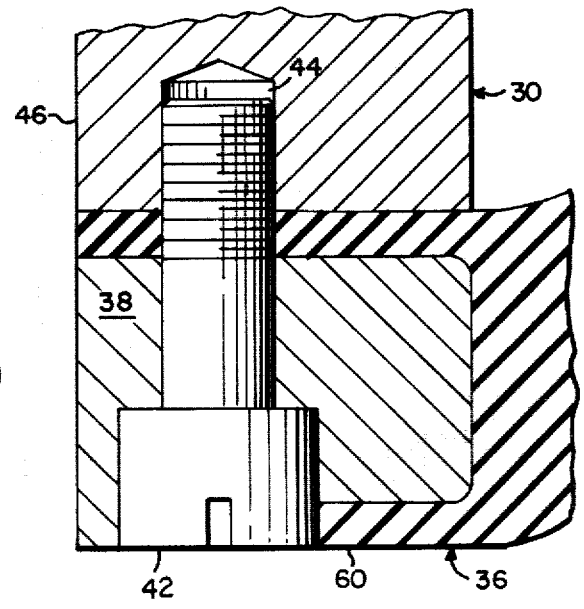
FIG. 5 is an enlarged portion of the mounting ring showing the securing of the ring to the housing by a bolt.

In accordance with the invention, the plate 36 is provided with a convex shape prior to the assembly of the housing, the convex shape being a section of a sphere as seen in FIG. 3. During the fabrication of the window 32, the mounting ring 38 is placed in a mold (not shown) and the uncured elastomer is forced into the mold under pressure. The elastomer is then cured at an elevated temperature, as in the vulcanizing of rubber, and forms a chemical bond to the mounting ring 38 which has been previously prepared with a primer and adhesive material as is well known in the art of elastomer preparation. The mold has the shape of a spherical section to provide the desired convex shape to the plate 36. After curing the elastomer, the mounting ring 38 with the convex plate 36 bonded thereto is removed from the mold. The mounting ring 38 has a set of holes 40 through which bolts 42 are inserted for securing the window 32 to the housing 30. An examplary bolt 42 is seen in FIG. 5, the bolt 42 being secured via threads to a hole 44 in a lip 46 of the housing 30.

With reference also to FIG. 6, the wall of the housing 30 is shown partially cut away to expose oil 48 contained within the housing 30. Also seen in FIG. 6 is an oil supply 50, a vacuum pump 52, and a funnel-shaped boot 54. The boot 54 is connected between the pump 52 and the window 32, the boot 54 being in contact with the ring 38 whereby the pump 52 applies a partial vacuum to the front surface of the window 32. During assembly of the housing 30, the window 32 is secured with the convex side of the plate 36 facing into the housing 30. The differential pressure across the window 32, resulting from the atmospheric pressure within the housing 30 and the reduced pressure within the boot 54, urges the plate 36 of the window 32 from the spherical shape to the planar shape. Thereupon, oil flows from the supply 50 via a port 56 to the interior of the housing 30 to fill the space between the window 32 and the transducers 34 with the oil 48. Upon completion of the filling of the housing 30 with the oil 48, the port 56 is sealed to maintain a constant volume of the oil 48. The oil is a substantially incompressible fluid, castor oil having been utilized in the preferred embodiment of the invention.

Upon the releasing of the vacuum within the boot 54, the plate 36 presses inwardly upon the oil developing a resultant pressure within the oil 48 which restrains the plate 36 from resuming the spherical shape. After removal of the boot 54 from the front face of the window 32, the flattened form of the window 32 is maintained by virtue of the incompressibility of the oil 48. The force of the oil 48 against the window 32 is counteracted by the forces of the bolts 42 which secured the window 32 to the lip 46 of the housing 30. The pressure of the oil 48 upon the window 32 also results in a compression of the elastomer of the plate 36 against the ring 38, thereby insuring a permanent adhesion of the elastomer to the ring 38 for preventing the entry of sea water along the interface between the plate 36 and the ring 38.

A shelf 58 is machined into the front surface of the ring 38, the shelf 58 extending radially outward to a distance approximately equal to that of the mounting holes 40 from the center of the ring 38. A front lip 60 of the plate 36 is formed within the shelf 58, the front lip 60 being a unitary structure with the plate 36 and being formed during the molding and curing of the plate 36. Also, a back lip 62 which completely covers the back surface of the ring 38 is similarly formed during the molding and curing operations, the back lip 62 being a unitary structure with the plate 36. During the molding operation, apertures of smaller diameter than the mounting holes 40 are formed within the back lip 62 and centered on the mounting holes 40 for securely engaging the threads of the bolts 42 upon attachment of the window 32 to the housing 30. A circumferential rib 64 extends outwardly from the back lip 62, in a direction parallel to the axis of the window 32, and is compressed between the lip 46 of the housing 30 and the back surface of the ring 38 during the attachment of the window 32 to the housing 30.

The back lip 62 is also compressed during the attachment of the window 32 to the housing 40 with the result that the elastomer of the back lip 62 is forced in intimate contact with the threads of the bolts 42, thereby providing further assurance against the possibility of leakage of water along the interface between the elastomer and the ring 38, and the elastomer and the bolts 42. It is noted that the interface between the front lip 60 and the shelf 58, plus the interface between the plate 36 and the inner cylindrical wall of the ring 38, and the interface between the back lip 62 and the back surface of the ring 38 comprise a sufficiently long path along the total interface between the elastomer and the ring 38 which militates against the entry of water along the interface to the interior of the housing 30.

Figure 4:
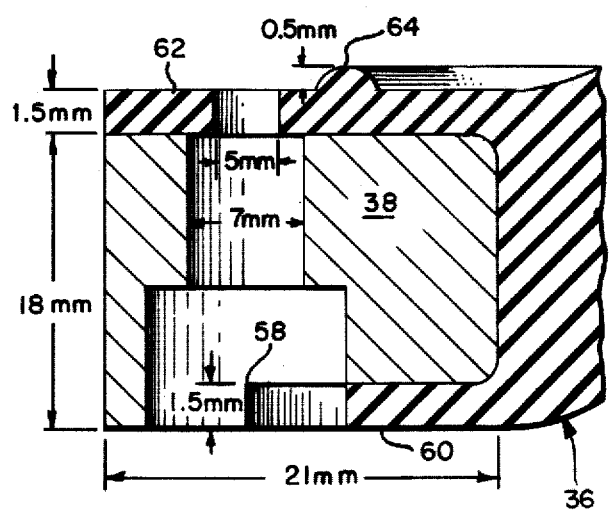
FIG. 4 is an enlarged view of the interface between the elastomeric plate and the mounting ring as designated in FIG. 3.

Exemplary dimensions of the window 32 are shown in FIGS. 3 and 4, these dimensions being the dimensions utilized in the building of a preferred embodiment of the invention. Thus, the ring 38 is seen to have a depth of 18 millimeters (mm) and a width of 21 mm. The lips 60 and 62, as well as the shelf 58, have a depth of 1.5 mm. The rib 64 has a height of 0.5 mm and a diameter of 245 mm. The center of the convex surface is displaced by 7.6 mm from the plate of the ring 38. The diameter of the ring 38 is 260 mm as measured between center lines of the holes 40. The portion of the hole 40 which encloses the shank of the bolt 42 has a diameter of 7 mm while the diameter of the corresponding aperture in the back lip 62 is reduced to a value of 5 mm to provide for the compression of the back lip 62 against the threads of the bolt 42 upon the securing of the ring 38 to the housing 30 as shown in FIG. 5. Also, with reference to FIG. 5, the rib 64 is not shown since it has been flattened into the upper lip under the compression between the ring 38 and the housing 30.

In the preferred embodiment of the invention, a natural rubber was utilized in fabricating the window 32, the rubber being vulcanized in a mold to provide the spherical shape, and being formulated by well known methods to have the properties shown in the following table:

| PROPERTY | TEST METHOD | SPECIFIED VALUE |
| --- | --- | --- |
| Density | ASTMD 297 | 1.09 ± 2% grams/cc |
| Durometer (shore A) | ASTMD 2240 | 53 ± 5 (nominal) |
| Tensile strength | ASTMD 412 | 4,000 PSI (min) |
| Ultimate elongation | ASTMD 412 | 600% minimum |
| Tear resistance (die C) | ASTMD 624 | 500 lbs/in (min) |
| Compression set | ASTMD 395 Method B @ 70° C. | 50% maximum |
| Brittle temperature | −62° C. (max) | |
| Sound velocity (bulk) | In sea water @ 20° C. @ 200 kHz | 1,550 ± 25 meters/sec |
| Water absorption | ASTMD 471 using salt water per ASTMD 1141; 48 hours @ 25° C. | |
| Transmission loss | | Less than 2 dB @ 200 kHz over temperature range of 4° C. to 32° C. |

In the foregoing table, the test methods are well known standard tests of the American Society of Testing of Materials. With respect to abbreviations used in the table, density is given in grams per cubic centimeter, tensile strength in pounds per square inch, tear resistance in pounds per inch, temperature in degrees centigrade, frequency in kilohertz, velocity in meters per second, and transmission loss in decibels.

The entire front surface of the window 32, exclusive of the holes 40, is coated with a protective coating for protection from petrochemicals frequently found in harbor waters, a coating of synthetic rubber, at least 10 mil thickness, of BUNA N/PVC per Mil - M-17508E (ships) having been used in the preferred embodiment of the invention. The chemical resistance of the rubber of the plate 36 to castor oil after a period of eight weeks at a temperature of 120° F. is such that the volumetric expansion does not change by more than 5%, the durometer (shore A) does not change by more than 5 points, the ultimate elongation does not change by more than 10%, and the tensile strength does not change by more than 10%.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

I claim:

1. A window for fluid filled sonar transducer housing comprising:
    a mounting ring having an inner circumferential surface; and
    an elastomeric plate secured to the inner cirumferential surface of said ring and clamped between said ring and said housing, said plate being molded with a convex inner and outer surface which faces the interior of said housing, said plate being compressed against said inner circumferential surface in response to pressure of said fluid against the inner convex surface which causes said plate to be deformed to reduce its convexity.

2. A window according to claim 1 wherein said plate is depressed away from said housing to become substantially flat in response to said fluid pressure.

3. A window according to claim 1 wherein said plate is cured with a shape that mates with said ring.

4. A window according to claim 1 wherein said plate is made from materials including an elastomeric substance from the class of elastomeric substances consisting of urethane, synthetic rubber and natural rubber, said elastomeric substances being cured in a convex shape.

5. A window according to claim 1 wherein said plate has a lipped edge for enclosing a portion of said ring.

6. A window for a fluid filled sonar transducer housing comprising:
    a mounting ring;
    an elastomeric member bonded to the inner circumferential surface of said ring, said member being molded with a convex shape, said member becoming substantially flat and being compressed against said inner circumferential surface of said ring in response to pressure of said fluid;
    said member having a lipped edge for enclosing a portion of said ring for inhibiting the entry of water into said housing, said lipped edge being on the convex side of said member and between said ring and said housing; and wherein
    said member is made of rubber, said rubber being vulcanized with and bonded to said ring during vulcanization, there being a bonding agent located along the interface between said member and said ring during vulcanization.

7. A window according to claim 6, said elastomeric member further comprising an axially extending rib of elastomeric material for contacting said housing.

8. A window according to claim 6 wherein said inner surface of said ring is cylindrical.

9. A sonar transducer housing comprising:
    an enclosure having a port at one end thereof;
    a sound transmissive window secured at said one end for enclosing said port, said window including a preformed semi-rigid disk encircled at its periphery by a ring, said disk having a convex surface form which is deformable along the axis of said ring in response to fluid pressure exerted against the convex surface of said disk, the convex surface of said disk facing the interior of said housing; and
    fluid filling means within a wall of said enclosure for admitting fluid into said enclosure and retaining said fluid under pressure, said pressure being great enough to force said disk against said ring with sufficient force to convert the convex surface of said disk to a substantially flat surface.

10. A housing according to claim 9 wherein said fluid is an incompressible liquid.

* * * * *